United States Patent [19]
Kim et al.

[11] Patent Number: 5,098,538
[45] Date of Patent: Mar. 24, 1992

[54] ELECTROACOUSTIC SOIL DECONTAMINATION

[75] Inventors: Byung C. Kim, Columbus; Satya P. Chauhan, Worthington; Harapanahalli S. Muralidhara, Dublin; Foster B. Stulen; Bassam F. Jirjis, both of Columbus, all of Ohio

[73] Assignee: Battelle Memorial Institute, Columbus, Ohio

[21] Appl. No.: 432,102

[22] Filed: Nov. 6, 1989

[51] Int. Cl.⁵ .............................................. B01D 13/02
[52] U.S. Cl. ................................. 204/182.2; 204/180.1; 204/158.2; 204/157.15; 204/299 R; 204/130
[58] Field of Search ................ 204/157.15, 158.2, 130, 204/182.2, 299 R, 180.1

[56] References Cited
U.S. PATENT DOCUMENTS
4,747,920 5/1988 Muralidhara .................... 204/157.42

FOREIGN PATENT DOCUMENTS
865225 9/1981 U.S.S.R. ............................ 204/182.4

Primary Examiner—John F. Niebling
Assistant Examiner—Arun S. Phasge
Attorney, Agent, or Firm—Klaus H. Wiesmann

[57] ABSTRACT

Apparatus and method for the in-situ removal of soil contaminants by the concurrent application of a D.C. electrical field and an acoustic field.

23 Claims, 3 Drawing Sheets

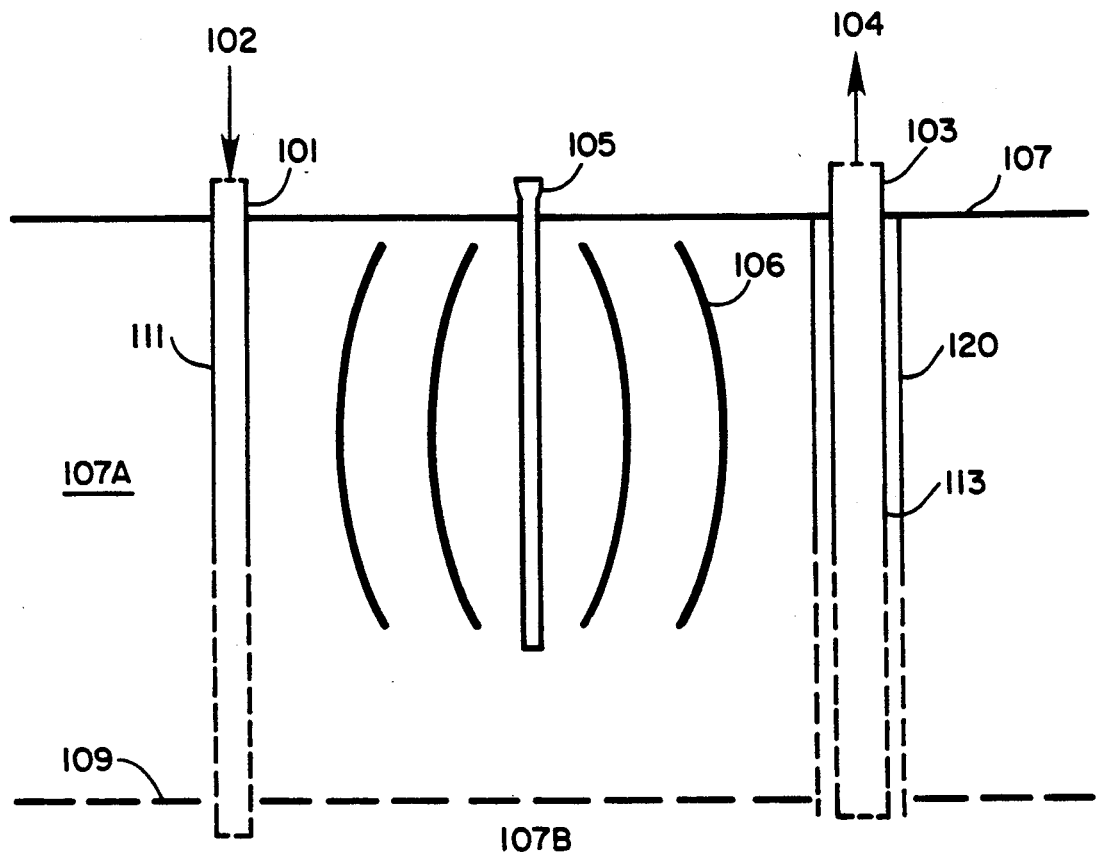
FIG. 1
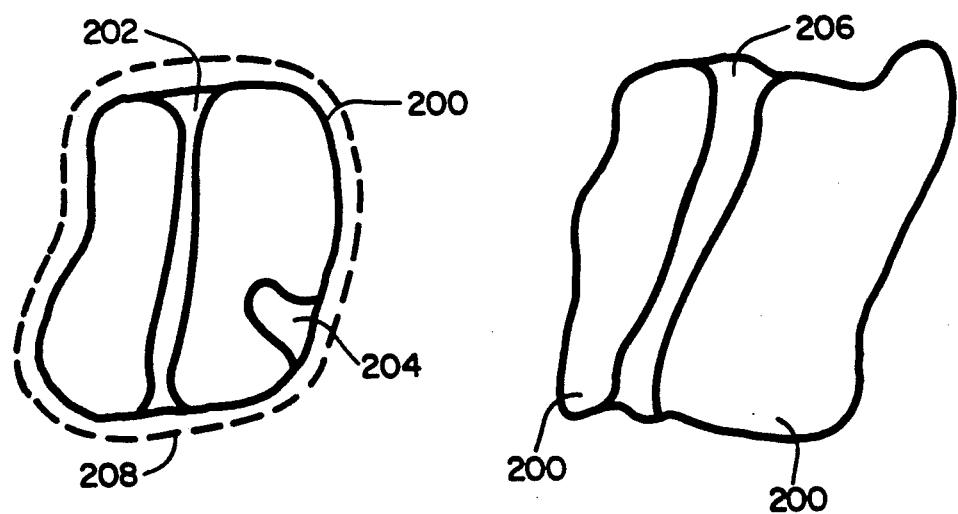
FIG. 2A  FIG. 2B

ELECTROACOUSTIC SOIL DECONTAMINATION

FIELD OF THE INVENTION

The present invention relates to the in situ decontamination of soil by the combined application of low frequency acoustic energy and D.C. electrical energy.

BACKGROUND OF THE INVENTION

Electroosmosis was first described by Reuss in 1808 in his experiment on migration of waterthrough wet clay under the influence of an electric field. Electroosmosis in porous media, such as clays, is due to an electrical double layer of negative and positive ions formed at the solid-liquid interface. For clay particles, the double layer consists of a fixed layer of negative ions that are firmly held to the solid phase and a diffuse layer of positive ions that are more loosely held. Application of an electric potential on the double layer results in the displacement of the two layers to respective electrodes; i.e., the positively charged layer to the cathode and the negatively charged layer to the anode.

Since the clay particles are immobile, the fixed layer of the ions is unable to move. However, the diffuse layer containing positive or negative ions can move and drag water along with it to the respective electrode. This is the basic mechanism of electroosmotic transport of water through porous media under the influence of an applied electric potential.

Liquid flow rate and energy use in electroosmosis can be expressed by the following equations:

$$\text{Flow: } Q \propto \frac{D\xi I}{\mu\lambda}$$

$$\text{Energy Use: } E = \frac{P}{Q} \propto \frac{\mu\lambda V}{D\xi}$$

where
- Q = flow rate of water
- D = dielectric constant of water
- $\xi$ = zeta potential
- I = current
- $\mu$ = viscosity of water
- $\lambda$ = electrical conductivity of cake
- E = energy use
- P = power input
- V = voltage.

The flow rate is proportional to current and inversely proportional to conductivity. The energy use is proportional to voltage and electrical conductivity. High electrical conductivity results in high energy use and waste of energy by resistive heating.

The dominant mechanism of the enhanced flow is electroosmosis due to the electric field. In situ electroosmosis was first applied successfully to soils by L. Casagrande in the 1930's in Germany for dewatering and stabilizing soils. Casagrande, L., "Electroosmosis and Related Phenomena", Harvard Soil Mechanics Series No. 66 (1962); and Casagrande, L., "Review of Past and Current Work in Electroosmotic Stabilization of Soils", Harvard Soil Mechanics Series No. 145 (1957). Recently, Muralidhara and co-workers at Battelle have discovered that the simultaneous application of an electric field and an acoustic field produce a synergistic effect and results in further enhancement of water transport. Muralidhara, H.S., and D. Ensminger, "Acoustic Dewatering and Drying: State-of-the-Art Review," Proceedings IV, International Drying Technology Symposium, Kyoto, Japan, 1984. Muralidhara, H.S., and N. Senapati, "A Novel Method of Dewatering Fine Particle Slurries," presented at International Fine Particle Society Conference, Orlando, Fla., 1984. Muralidhara, H. S., et al., Battelle's Dewatering Process for Dewatering Lignite Slurries, Battelle Phase I Report to UND Energy Research Center/EPRI, 1985. Chauhan, S.P., H.S. Muralidhara, B. C. Kim, "Electroacoustic Dewatering of POTW Sludges", Proc. National Conf. on Municipal Treatment Plant Sludge Management, Orlando Fla., May 28-30, 1986. Muralidhara, H. S., et al., "A Novel Electro Acoustic Process for Separation of fine Particle Suspensions", Ch. 13, pp. 374, in *Advances in Solid-Liquid Separation,* Editor H.S. Muralidhara. Muralidhara, H.S., N. Senapati, and B.K. Parekh, Solid-Liquid Separation Process for Fine Particle Suspensions by an Electric and Ultrasonic Field, U.S. Pat. No. 4,561,953, December 1985. Senapati, N., H.S. Muralidhara and R.E. Beard on "Ultrasonic Interactions in Electro-acoustic Dewatering", presented at British Sugar Technical Conference, Norwitch, U.K., June 1988. Muralidhara, H.S., "Recent Developments in Solid-Liquid Separation", presented at the Trilateral Particuology Conference in Peking, China, September 1988. Beard, R.E., and H.S. Muralidhara, "Mechanistic Considerations of Acoustic Dewatering Techniques", Proc. IEEE, Acoustic Symposium, pp. 1072-1074, 1985. Muralidhara, H.S., Editor, *Recent Advances in Solid-Liquid Separation,* Battelle Press, Columbus, Oh. November 1986.

The electroosmotic flow is independent of the capillary diameter, a key advantage of electroosmosis over conventional flow under a pressure gradient. In the absence of an electric field, the flow of water through small pores essentially stops.

Some noteworthy examples of the prior work on soil leaching, consolidation, and dewatering by electroosmosis are presented below. Numerous patents have been issued in various applications of electric field for enhanced recovery of crude oil. Bell, T.G., U.S. Pat. No. 2,799,641 (1957). Faris, S.R., U.S. Pat. No. 3,417,823 (1968). Gill, W.G., U.S. Pat. No. 3,642.066 (1972). Bell, C. W., and Titus, C.H., U.S. Pat. No. 3,782,465 (1974). Kermabon, A.J., U.S. Pat. No. 4,466,484 (1984). Hardy, R.M., Unpublished presentation at NRC Canada, Ottawa, Canada (Dec. 1953). Banerjee, S., "Electrodecontamination of Chrome-Contaminated Soils", Land Disposal, Remedial Action, Incineration and Treatment of Hazardous Wastes, Proc. Thirteenth Annual Research Symposium, pp. 192-201 (July, 1987), Horng, J.J., BanerJee, S., and Hermann, J.G., "Evaluating Electrokinetics as a Remedial Action Technique", Second International Conference on New Frontiers for Hazardous Waste Treatment, Pittsburgh Pa. (Sept. 27-30, 1987). Anbah, S.A., et al., "Application of Electrokinetic Phenomena in Civil Engineering (S and Petroleum Engineering", Annuals, Volume 118, Art. 14, (1965).

According to Lageman, R., "Electro Reclamation in Theory and Practice", presented at Forum on Innovative Hazardous Waste Treatment Technologies' at Atlanta, Ga., June 19-21, 1989, the following factors play a key role in determining the efficiency of electrolysis process during heavy metal decontamination of the soil. These factors are:

Nature of contaminant

Concentration of heavy metals
Soil type
Ionic radius
Solubility of contaminant as a function of pH
Ease of release of contaminant from the soil
pH control around the electrodes.

An acoustic field is one in which pressure and particle velocity vary as a function of time and position. These fluctuations form a wave which propagates from the source throughout the medium. The pressure fluctuations may be sinusoidal and are characterized by their pressure amplitude and frequency. A particle velocity is imparted to the medium by the action of the pressure wave, and also varies as a function of time, frequency and position. Acoustic pressure and particle velocities are related through the acoustic impedance of the medium.

The pressure fluctuations are the result of the transmission of mechanical energy that can perform useful work to bring about desired effects. The type and magnitude of these effects depend on the medium. In acoustic leaching many of the forces which can contribute to the overall effectiveness. These include:

Orthokinetic forces which cause small particles to agglomerate
Bernoulli's force which causes larger particles to agglomerate
Rectified Diffusion which causes gas bubbles to grow inside capillaries and thereby expel entrapped liquids
"Rectified" Stokes, force which causes an apparent viscosity to vary nonlinearly and forces the particle towards the source
Decreased Apparent Viscosity which may be due to high strain rates in a thixotropic medium or localized heating which in turn lowers both the viscosity and the driving force to move particles
Radiation Pressure is a static pressure which is a second order effect adding to the normal pressure differential.

A more thorough review is available in the two articles by Ensminger and Muralidhara, et al. that appear in *Advances in Solid-Liquid Separation* above.

Many U.S. sites are contaminated with heavy metals such as zinc, mercury, cadmium, chromium arsenic, etc., and anion like cyanide. An object of the invention is to decontaminate soils containing heavy metals by the application of D.C. and acoustic fields.

SUMMARY OF THE INVENTION

An apparatus for promoting the in situ recovery of subsurface soil contaminants from a contaminated zone comprising: First electrode means inserted in the soil at least in proximity to the contaminated zone; second (oppositely charged) electrode means inserted in the soil in spaced relationship to the first electrode means whereby at least a portion of the contaminated zone is between the electrode means; acoustic means in proximity of the contaminated zone for generating acoustic waves that penetrate the contaminated zone so as to provide acoustic waves to the portion of the contaminated zone between the electrode means; and means for withdrawing liquid from the soil.

A method for in situ removal of contaminants from a contaminated zone in subsurface soil comprising: Placing a first electrode means in the soil at least in proximity to the contaminated zone; placing a second electrode means in the soil in spaced relationship with the first electrode means whereby at least a portion of the contaminated zone is between the electrode means; placing an acoustic means in proximity of the contaminated zone; applying electrical energy to the electrodes adapted to provide a movement of contaminants to one electrode and concurrently applying acoustic energy that penetrates the portion of the contaminated zone between the electrode means; withdrawing liquid containing contaminants from the soil. A plurality of first and second electrodes may be placed in the soil so as to provide for a plurality of regions of the contaminated zone located between first and second electrode means.

BRIEF DESCRIPTION OF THE DRAWINGS

FIG. 1 is a semischematic drawing of one embodiment of the invention applied to removal of subsurface contamination by in-situ washing.

FIG. 2A and FIG. 2B each depict semischematic representation of soil particles and the trapping of contaminants therein.

DETAILED DESCRIPTION OF THE INVENTION

Figure 3:
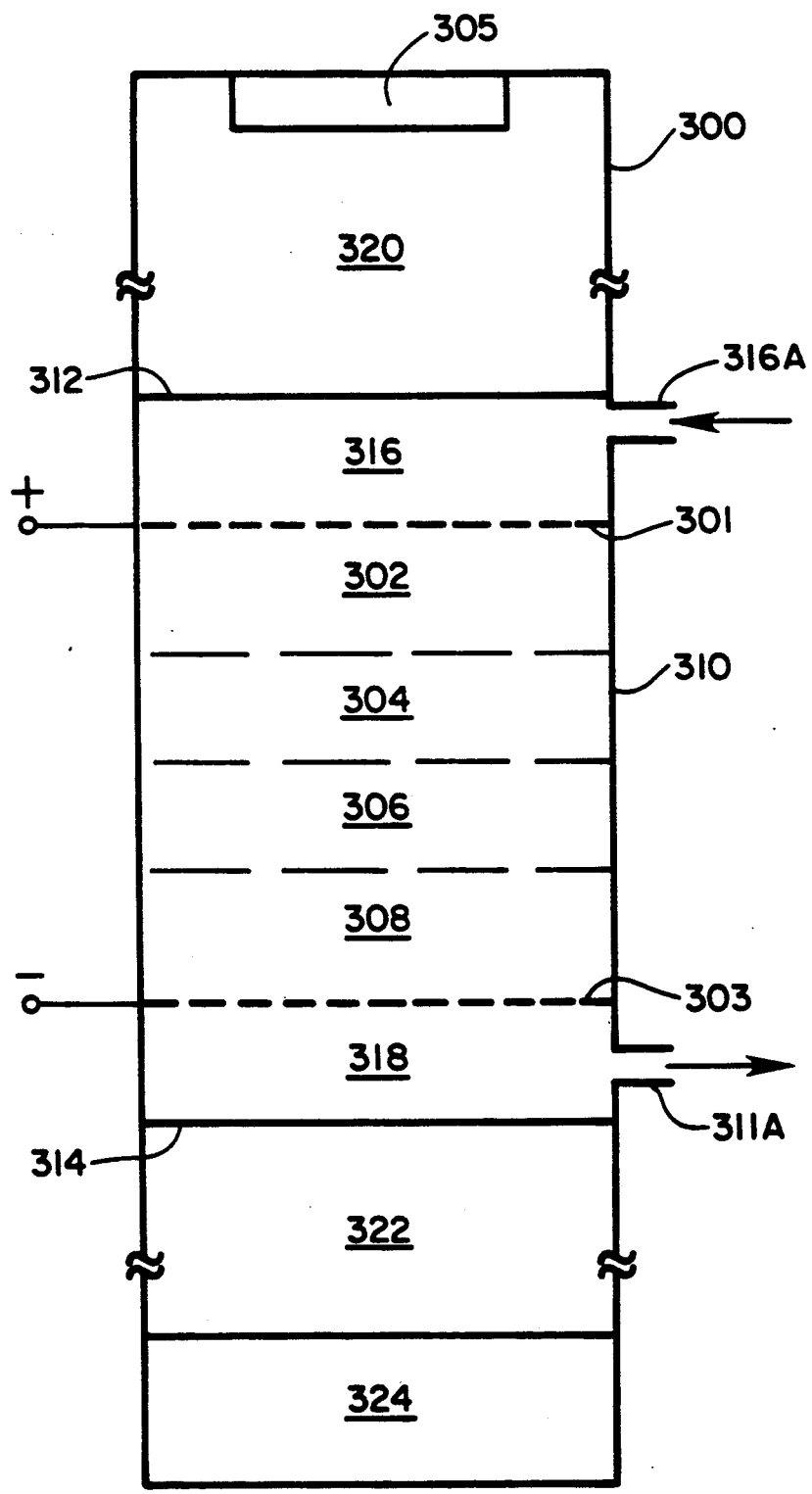
FIG. 3 is a semischematic drawing of the test apparatus used herein.

The apparatus and process are based on applications of a D.C. electric field and an acoustic field to contaminated soils to obtain increased transport of liquids through the soils. FIG. 1 illustrates the operating principle of the process. Electrodes, an anode 101 (one or more) and a cathode 103 (one or more), and an acoustic source 105 (one or more) are placed in or near contaminated soil to apply an electric current and acoustic waves 106 to the soil. Decontamination is accomplished by in-situ washing of the soil by a liquid 102, which is pumped into the anode well, diffuses through the contaminated soil and carries off contaminants, and is withdrawn from the cathode well as contaminated liquid 104. Increased transport of liquids through the soil is obtained by application of the electric current and the acoustic waves. The process is expected to be most effective for clay-type soils with small pores or capillaries, in which the hydraulic permeability is very small.

A precise understanding of the relative significance of each of the listed mechanisms or a given system/medium is unavailable. The contributions to effective acoustic leaching are also dependent on the type of material being treated since all the above mechanisms depend on the physical/chemical properties of the material under treatment. Therefore, it is difficult to predict performance a priori, and experimental testing was needed to establish baseline performance.

To introduce high energy acoustic signals into the ground, one must address the issues of elastic wave propagation in solids. The earth for the purposes of in situ leaching can be treated as a semi-infinite half space where the earth's surface is the boundary of the half-space. It is well known that a source acting normal to and on the surface not only produces acoustic waves (more properly referred to as compression waves in this case) but two additional waves as well. These are shear waves where particle velocity is perpendicular to the direction of propagation, and surface waves. Surface waves exist at the boundary and extend a given depth into the medium which is inversely proportional to the wavelength, and produce elliptical particle motions.

Thus, the energy into the soil is partitioned into these three types of waves with roughly 10 percent going into compression, 25 percent into shear and 65 percent into surface waves. Likewise, as the signal propagates from the source, the intensity of the compression and shear waves decrease as the inverse of distance squared because they are propagating in the bulk of the material. Since the surface waves propagate at the surface of the material, their intensity decreases as the inverse of the square root of distance. In addition, all three waves will be further reduced by soil attenuation which generally increases by the square of frequency. Therefore, lower frequency waves will propagate (i.e., penetrate) much farther. Buried sources would produce mainly shear and compression waves. The relative amounts depend on the design of the source.

Experimental work herein has focused on acoustic (compression) waves. However, the beneficial effects of decreased apparent viscosity are expected to be greatly improved with shear waves.

Acoustics, when properly applied in conjunction with electroseparation and water flow, enhances dewatering or leaching. The phenomena that augment dewatering when using the combined technique are not fully understood. However, while not wishing to be bound by any theory we have developed some hypotheses about possible mechanisms. It is theorized that, in the presence of a continuous liquid phase, the acoustic phenomena (e.g., inertial and cavitation forces) that separate the liquid from the solid into the continuum are facilitated by the electric field and a pressure differential to enhance dewatering by means of one or more of the electroseparation phenomena. There is also evidence of synergistic effects of the combined approach. In addition, as the soil is densified (by sequestration andelectroosmosis), the liquid continuum would be normally lost, but it is believed that by channelling, on a macroscale, acoustic energy delays the loss of the continuum making additional dewatering/leaching possible.

Soil particles are generally colloidal in nature and the structure of a soil particle 200 may be indicated, as shown in FIG. 2. Application of an electric field will tend to mobilize the liquid present in an open capillary such as 202 by electroosmosis. An acoustic field has the ability to pump out the liquid present in open pores 202 and closed pores 204 by a mechanism called rectified diffusion (discussed above), allowing removal of contaminants trapped between particles 206 as well as removal of contaminants from the chemisorbed surface 208. Application of an acoustic field can also rearrange the particles, creating new channels to assist electroosmosis. Rearrangement of particles by acoustic field opens up new capillaries, and hence, electroosmosis becomes more effective. It was postulated that application of electroacoustics in the presence of a hydraulic gradient would basically enhance co-transport of contaminants with movement of water and transport heavy metals by ion migration and electroosmosis.

The potential applicability for combined electric and acoustic field soil decontamination (ESD) is expected to range from zinc to other heavy metals, such as Cr, Cd, and Pb, and anions, such as cyanide as soil contaminants. Zinc, on the other hand, is one of the heavy metals that is frequently found as a soil contaminant. Selection of zinc is also based on its low toxicity and relative simplicity involved in handling, analysis, and disposal.

If the acoustic field is to treat the bulk of the soil in the ultimate application, it is necessary to minimize attenuation. In most homogeneous materials the attenuation increases as the square of frequency. Published data on clays indicate that attenuation at 400 Hz is on the order of 1 to 2 dB per foot, at 1000 Hz is 8 to 9 dB per foot and at 4000 Hz is 20 to 33 dB per foot. Therefore it is clear that in order to obtain reasonable penetration one needs to keep the frequency under 500 Hz.

The electrodes 301, 303 to generate the electric field were placed in the test cell 300 at a given distance from the acoustic source 305. These were fabricated as a sandwich with insulating standoffs 310 used to set the interelectrode separation. The electrodes 301, 303 themselves were fairly thin mesh screens to allow the acoustic energy and liquid to pass.

The test cell was sandwiched between two thin polymer sheets (membranes) 312, 314. The purpose of the sheets was to contain the liquid within the test cell but allow the acoustic waves to pass through the soil sample.

Soil Characteristics

A soil sample was obtained from Paulding, Ohio, with the assistance of the Soil Conservation Service. Table 1 presents the particle size distribution of the as received soil. The sand, silt, and clay contents were 10.8–11.7, 27.2–29.0 and 61.4–59.3 percent, respectively. Based on the U.S. Department of Agriculture textural classification, the soil used in the present study falls into the category of clay. The soil was acidic and had a pH of about 5.5. Organic matter in this clay soil was 1.87 percent by weight.

TABLE 1

PARTICLE SIZE DISTRIBUTION OF SAMPLES OF THE SOIL
Particle Size Distribution (% <2 mm)

| Sand (mm) | | | | | |
|---|---|---|---|---|---|
| VCS 2–1 | CS 1–0.5 | MS 0.5–0.25 | FS 0.25–0.1 | VFS 0.1–0.05 | TS 2–0.05 |
| 0.7 | 1.8 | 3.0 | 4.2 | 1.6 | 11.2 |
| 0.8 | 1.9 | 2.8 | 4.0 | 1.8 | 11.1 |
| 0.8 | 2.0 | 3.0 | 4.1 | 1.7 | 11.7 |
| 0.6 | 1.8 | 2.8 | 3.8 | 1.9 | 10.8 |

| Silt (μm) | | | | Clay (μm) | | | |
|---|---|---|---|---|---|---|---|
| CSI 50–20 | MSI 20–5 | FSI 5–2 | TSI 50–2 | CC 2–0.2 | FC <0.2 | TC <2 | Text. Class |
| 10.1 | 5.6 | 11.8 | 27.5 | 39.9 | 21.6 | 61.4 | Clay |
| 11.7 | 4.7 | 11.2 | 27.5 | 39.7 | 21.8 | 81.5 | Clay |
| 4.6 | 9.1 | 15.3 | 29.0 | 40.2 | 19.1 | 59.3 | Clay |
| 12.1 | 4.2 | 11.0 | 27.2 | 39.8 | 22.4 | 62.1 | Clay |

VCS - Very Coarse Sand
CS = Coarse Sand
MS - Medium Sand
FS = Fine Sand
VFS = Very Fine Sand
TS = Total Sand
CSI - Coarse Silt
MSI - Medium Silt
FSI = Fine Silt
TSI = Total Silt
CC = Coarse Clay
FC = Fine Clay
TC = Total Clay
Text. = Texture

EXAMPLE: ZINC REMOVAL

Bench-scale experiments were performed to study the effect of electric and acoustic fields on the removal of zinc from a clay soil. Experimental apparatus consisted of a plastic column, 3 inches in inside diameter and approximately 43 inches in overall height. A test cell is located in the middle of the plastic column. Electrodes 301, 303 were placed 4.5 inches apart in the test cell with the anode at the top and the cathode at the bottom. A soil sample to be tested was placed in the test cell between the two electrodes. Polymer membranes 312, 314 were placed approximately ½ inch above the anode and approximately ½ inch below the cathode 303. These membranes served to contain the liquid in the test cell but allowed the acoustic waves to penetrate through the test soil. At the bottom of the test chamber is an anechoic chamber 324 to eliminate the reflection of acoustic energy back into the test chamber. An acoustic field was applied from an acoustic source 305 located approximately 19 inches above the anode. Acoustic energy absorbed by the test sample was measured with two hydrophones (not shown) located approximately 6 inches above the anode and 6 inches below the cathode. The column spaces 320, 322 above and below the test cell were filled with wet sand to transmit acoustic energy from the acoustic source to the test cell and to the hydrophone. The acoustic source used was an Unholtz-Dichie Model 1 electromagnetic shaker, which can be operated at frequencies between 10 and 10,000 Hz. Hydrophones used were B&K Model 8103. Soil samples to be tested were prepared by mixing a 0.55 percent by weight zinc chloride ($ZnCl_2$) solution with dry soil to obtain a sample containing 42.1 percent by weight water and 0.17 percent (1700 ppm) by weight Zn (on a dry basis).

A test was run by placing a soil sample in the test cell and applying electric and acoustic fields to the sample over a treatment period of 50 hours. During the test, distilled water was supplied to the anode 301 at inlet 316A and allowed to diffuse through the soil sample and withdrawn at the cathode 303 at outlet 318A. Chambers 316 and 318 are filled with liquid. After each test, the soil sample was divided into four layers (302, 304, 306, and 308) of approximately equal thickness, and each layer was analyzed separately to determine the longitudinal distribution of Zn concentration in the soil sample between the electrodes.

Test results are summarized in Table 2. Example 1 carried out at a relatively low D.C. current of 5 milliamperes and an acoustic power input of 0.44 watt showed relatively small migration of Zn within the solid sample. Increasing the D.C. current to 50 milliamperes in Example 2 resulted in a substantial increase in the migration of Zn from Layer 1 next to the anode to Layer 4 next to the cathode. Zinc concentration in Layer 4 was 5644 ppm in Example 2, or approximately 3 times the initial concentration of 1700 ppm, which indicates accumulation of Zn near the cathode by precipitation of Zn at basic pH conditions near the cathode. Application of an acoustic field in Examples 3 and 4 resulted in increased migration of Zn compared with Example 2 without acoustic field. In Example 3, significant reduction of Zn was obtained in all sample layers with acoustic field compared with Example 2 without acoustic field. In Example 4, reduction of Zn was obtained in Layers 1, 2 and 4. Beneficial effect of acoustic field in Zn migration was obtained at a frequency of 400 Hz in Example 3 and also at a frequency of 800 Hz in Example 4. Thus, the acoustic effect was demonstrated over a range of frequencies. As noted low frequencies are preferred such as those below 1000 Hz and most preferably those below 500 Hz.

TABLE 2

MIGRATION OF ZINC IN CLAY SOIL UNDER THE INFLUENCE OF ELECTRIC AND ACOUSTIC FIELDS

|  | Ex. 1 | Ex. 2 | Ex. 3 | Ex. 4 |
|---|---|---|---|---|
| Treatment Time, hr. | 50 | 50 | 50 | 50 |
| D.C. Current, milliamp | 5 | 50 | 50 | 50 |
| Acoustic Frequency, Hz | 400 | — | 400 | 850 |
| Acoustic Power, watt | 0.44 | 0 | 0.44 | 0.23 |
| Zinc Concentration in Soil, mg/kg[a] | | | | |
| Layer 1 (302) | 1175 | 180 | 173 | 166 |
| Layer 2 (304) | 1529 | 687 | 644 | 585 |
| Layer 3 (306) | 1501 | 1847 | 1532 | 1858 |
| Layer 4 (308) | 1722 | 5644 | 4054 | 4513 |

[a]Initial concentration = 1700 mg/kg. Soil sample was divided into four equal layers and labeled consecutively starting from the top next to the anode to the bottom next to the cathode.

While in operation to remove contaminants the anode 101 and cathode 103 should be placed to a depth sufficient to cover the depth of the contaminated zone 150. The distance that the anode 101 and cathode 103 are placed apart will depend on the conductivity of the soil. However, additional water may be pumped into the soil via well 111 at anode 101 or by additional wells advantageously placed to maintain conductivity and flow as water is removed at the cathode well 113. Surfactants may advantageously be added to the liquid 102 as well as electrolytes to obtain enhanced removal of contaminants from the soil and to enhance the electroosmotic flow, acid may also be added to enhance the removal of heavy metals by solubilizing them. The wells may be drilled above or below the water table as desired, depending on the nature of the contaminated zone. Where the contaminants have reached the water table 109, one or more removal wells 113 to at least the depth of the water table may be desired as shown in FIG. 1. Should the contamination only exist in the unsaturated zone 150, 107 then of course well 111 and well 113 need not be as deep.

Figure 4:
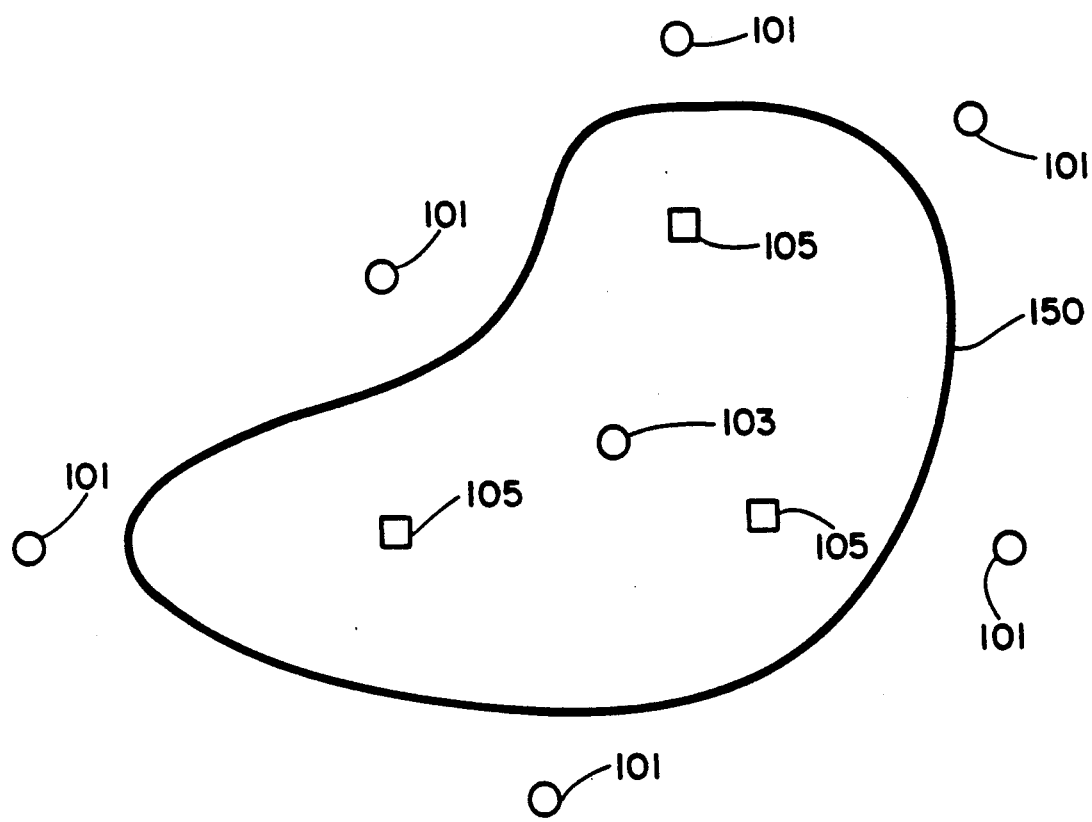
FIG. 4 and 5 are schematic representations of two embodiments of the invention of several well spacings.
Figure 5:
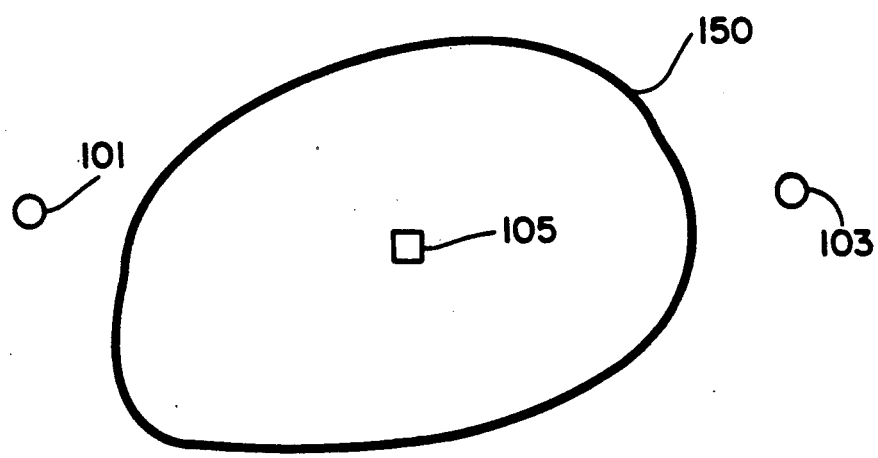

FIGS. 4 and 5 illustrate possible configurations of this technology. FIG. 4 illustrates a configuration using a central cathode 103 surrounded by multiple anodes 101 and acoustic sources 105. FIG. 5 is the simplest case.

The acoustic source 105 may be positioned on the surface of the ground or have a probe inserted into the ground. If desired a separate well may be drilled for insertion of the acoustic source 105. Alternatively the acoustic source may also be placed in the wells used for the anode and/or cathode.

The soil 107 comprises an unsaturated zone 107A and a saturated zone 107B below the water table 109. The electrodes 101, 103 may be part of metal linings of drilled wells or be inserted separately therein. Appropriate electrode materials are carbon steel, stainless steel, aluminum, or platinized titanium for the anode, and the like. Appropriate anode materials are graphite, platinized aluminum, titanium coated with mixed oxides of platinum group metals, and the like. Although, if sacrifice of the metal is tolerable ordinary metals such as iron, aluminum, steel and the like may be used.

In operation D.C. or pulsating D.C. electric power from an electrical power source is provided to the electrodes 101, 103. The acoustic source is also appropriately energized. It is desired to maintain reasonable voltages at the electrodes 101, 103 both for ease of application and for reasons of safety. Currents below 100 amperes per well should be used and preferably below 20 amperes per well. Reasonable voltages are 500 volts and being preferably below 200 volts.

During the application of a D.C. electrical field, electrolysis of water occurs at the electrodes 101, 103, generating oxygen at the anode and hydrogen at the cathode. Electrolysis of water also results in the generation of H+ ions at the anode 101 which results in an acidic condition around the anode 101 and the generation of OH− ions at the cathode 103 which results in a basic condition around the cathode 103. The H+ ions generated at the anode 101 will be beneficial to the removal of heavy metals by solubilizing the heavy metals. At the cathode 103, however, the OH− ions combine with heavy metal ions to form heavy metal hydroxides that precipitate out and may become immobilized in the soil. In the ESD process, therefore, the cathode may need to be flushed with an acid to dissolve and remove the heavy metal precipitates. In a further embodiment, the second electrode (cathode) further includes an annular compartment 120 that surrounds the second electrode 20 that allows neutralization of material in and near the annular compartment that allows the removal of contaminants without their precipitation in the soil surrounding the cathode. For example acid would be added to the material in the annular compartment to neutralize the OH− ions generated at cathode 103. The addition of acid may be accomplished by methods known in the art. Alternatively, after completion of treatment an annular soil ring around the cathode that is high in contaminants may be removed. In FIG. 1 wells 111, 113 and compartment 120 are understood to be perforated as needed to allow passage of liquids to or from the soil. Appropriate soil samples taken during treatment may be helpful in assessing when treatment may be stopped or whether further additives are required.

While the forms of the invention herein disclosed constitute presently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

We claim:

1. An apparatus for the in situ recovery of subsurface soil contaminants from a contaminated zone comprising:
    a. first electrode means inserted in the soil at least in proximity to the contaminated zone;
    b. second electrode means inserted in the soil in spaced relationship to the first electrode means whereby at least a portion of the contaminated zone is between the electrode means;
    c. acoustic means in proximity of the contaminated zone for generating acoustic waves that penetrate the contaminated zone so as to provide acoustic waves to the portion of the contaminated zone between the electrode means;
    d. means for withdrawing liquid from the soil; and wherein an annular compartment surrounds the electrode that is functioning as a cathode.

2. The apparatus of claim 1, further comprising:
    e. means for introducing liquids into the contaminated zone.

3. The apparatus of claim 1, wherein the first electrode means comprises an anode and the second electrode means comprises a cathode.

4. The apparatus of claim 3, wherein the first electrode means further comprises a metal lining of an injection well and the second electrode means further comprises a metal lining of a pumping well.

5. The apparatus of claim 1, wherein the acoustic means comprises an acoustic generator on the surface of soil adapted to transmit acoustic energy below ground.

6. The apparatus of claim 1, wherein the acoustic means comprises an acoustic generator and transmittal means inserted in the soil.

7. The apparatus of claim 6, wherein the transmittal means is located in the contaminated zone.

8. The apparatus of claim 1 wherein a plurality of first and second electrodes are inserted in the soil.

9. A method for in situ removal of contaminants from a contaminated zone in subsurface soil comprising:
    a. placing a first electrode means in the soil at least in proximity to the contaminated zone;
    b. placing a second electrode means in the soil in spaced relationship with the first electrode means whereby at least a portion of the contaminated zone is between the electrode means;
    c. placing an acoustic means into or in proximity of the contaminated zone;
    d. applying electrical energy to the electrode means adapted to provide a movement of contaminants toward one electrode means, and concurrently applying acoustic energy that penetrates the portion of the contaminated zone between the electrode means;
    e. introducing acid around the electrode means that function as a cathode to neutralize the OH− ions generated at the cathode; and
    f. withdrawing liquid contains contaminants from the soil.

10. The method of claim 9, further comprising:
    g. introducing liquid into the contaminated zone.

11. The method of claim 9, further comprising providing a positive d.c. or pulsating d.c. voltage to the first electrode means and a negative d.c. or pulsating d.c. voltage to the second electrode means so as to provide a current flow from the first to the second electrode means.

12. The method of claim 11 further comprising injecting a liquid at the electrode means functioning as an anode and removing liquid at the electrode means functioning as a cathode.

13. The method of claim 9, further comprising generating acoustic energy at the surface of the soil and transmitting the energy below the surface.

14. The method of claim 9, further comprising generating the acoustic energy below the soil surface.

15. The method of claim 9, further comprising placing a plurality of first and second electrodes in the soil so as to provide for a plurality of regions of the contaminated zone to be located between first and second electrode means.

16. The method of claim 10, further comprising adding surfactants and/or electrolytes to the liquid introduced to the contaminated zone.

17. A method for in situ removal of contaminants from a contaminated zone in subsurface soil comprising:
    a. placing a first electrode means in the soil at least in proximity to the contaminated zone;
    b. placing a second electrode means in the soil in spaced relationship with the first electrode means whereby at least a portion of the contaminated zone is between the electrode means;

c. placing an acoustic means into or in proximity of the contaminated zone;

d. applying electrical energy to the electrode means adapted to provide a movement of contaminants toward one electrode means, and concurrently applying acoustic energy that penetrates the portion of the contaminated zone between the electrode means;

e. introducing as liquid into the contaminated zone and adding acid to the liquid introduced; and f. withdrawing liquid containing contaminants from the soil.

18. A method for in situ removal of contaminants from a contaminated zone in subsurface soil comprising:

a. placing a first electrode means in the soil at least in proximity to the contaminated zone;

b. placing a second electrode means in the soil in spaced relationship with the first electrode means whereby at least a portion of the contaminated zone is between the first and second electrode means;

c. placing an acoustic means into or in proximity of the contaminated zone;

d. applying electrical energy to the electrode means adapted to provide a movement of contaminants toward one electrode means, and concurrently applying acoustic energy that penetrates the portion of the contaminated zone between the electrode means;

e. withdrawing liquid containing contaminants from the soil; and f. removing an annular ring of soil around the electrode means that functions as a cathode after completion of treatment.

19. The method of claim 18, further comprising:

g. introducing liquid into the contaminated zone.

20. The method of claim 19, further comprising adding surfactants and/or electrolytes to the liquid introduced to the contaminated zone.

21. The method of claim 19, further comprising adding acid to the liquid introduced to the contaminated zone.

22. The method of claim 9, further comprising introducing the acid by flushing the cathode.

23. The method of claim 9, further comprising providing an annular compartment that surrounds the cathode and adding acid to the annular compartment to neutralize hydroxide ions.

* * * * *

UNITED STATES PATENT AND TRADEMARK OFFICE
CERTIFICATE OF CORRECTION

PATENT NO. : 5,098,538
DATED : March 24, 1992
INVENTOR(S) : Byung C. Kim, et. al.

It is certified that error appears in the above-indentified patent and that said Letters Patent is hereby corrected as shown below:

Column 1, line 11, "waterthrough" should be --water through---.

Column 2, line 44, "3,642.066" should be --3,642,066--.

Column 2, line 53, "BanerJee" should be --Banerjee--.

Column 2, line 59, remove "(S".

Column 3, line 31, "Stokes," should be --Stokes'--.

Column 5, line 36, "andelectroosmosis)," should be --and electroosmosis),--.

Column 7, line 7, after "anode" insert --301--.

Column 8, line 33, after "zone" insert --150--.

Column 8, line 38, delete "150,".

Column 10, line 34, "contains" should be --containing--.

Signed and Sealed this

Fifth Day of April, 1994

Attest:

BRUCE LEHMAN

*Attesting Officer*    *Commissioner of Patents and Trademarks*